Figure 1:
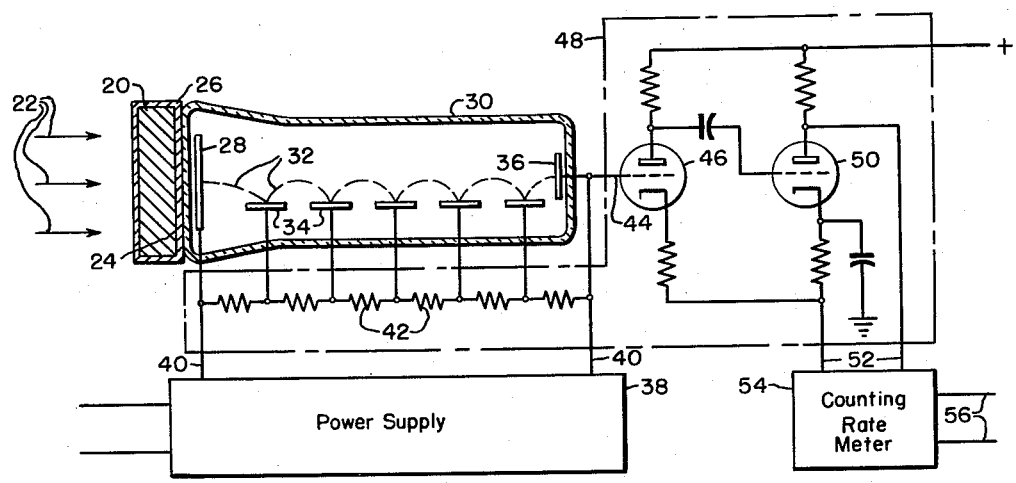

Aug. 1, 1961  KUAN-HAN SUN ET AL  2,994,769
SCINTILLATION COUNTER
Filed April 29, 1957

WITNESSES:
Bernard R. Gieguey
Donald J. Smith

INVENTORS
Kuan-Han Sun and
Frances A. Pecjak.
BY Arthur T. Stratton
ATTORNEY

United States Patent Office 2,994,769
Patented Aug. 1, 1961

2,994,769
SCINTILLATION COUNTER
Kuan-Han Sun and Frances A. Pecjak, Pittsburgh, Pa., assignors to Westinghouse Electric Corporation, East Pittsburgh, Pa., a corporation of Pennsylvania
Filed Apr. 29, 1957, Ser. No. 655,750
12 Claims. (Cl. 250—71.5)

The instant invention relates to the detection and measurement of neutrons and more paritcularly to a scintillation counter adapted for use with slow or thermoneutrons.

The demand for neutron detectors and counters has steadily increased since the recognition of the existence and nature of neutrons about 1932. The neutron was found to be a chargeless particle having about the same mass as a hydrogen atom. Although first produced by bombarding a light element such as beryllium with alpha particles, neutrons are now produced in a variety of nuclear reactions such as bombardment of light elements such as beryllium, lithium, boron, fluorine and aluminum with high energy protons, deuterons or alpha particles. Neutrons are also produced in fission reactions such as those occurring in a nuclear reactor and in this relationship are categorized into fast and slow or thermoneutrons, depending on the comparison of their kinetic energies with that of thermally agitated hydrogen atoms. Accordingly, thermoneutrons, as the name implies possess kinetic energies of the order of that displayed by atoms of hydrogen at ordinary temperatures.

Since neutrons possess no charge, they are not directly detectable by Geiger tubes, cloud chambers or other ionization chambers. Therefore, it has become customary to detect neutrons by causing a nuclear reaction such as the neutron-alpha reaction or the neutron-proton reaction and detecting the resulting charged particles released by the reaction by means of ionization chambers and the like.

In the present invention the aforesaid gas-filled ionization chamber is eliminated and a simplified form of scintillation detection of uncharged particles is utilized. The material comprising the scintillating detector is a luminophor, also called a phosphor, which luminesces or gives off scintillations under certain conditions when bombarded by neutrons. Such a luminophor must be transparent or at least translucent to its own luminescence, which is necessary to permit the light of the scintillation to escape from the interior of the luminophor for appropriate measurement thereof. In prior scintillation counters employing luminophors such as naphthalene, anthracene, zinc sulfide, zinc silicate, scheelite or the like, the usage of these compounds has been restricted by certain physical limitations imposed by the luminophors. For example, it has been found to be necessary that the size of the luminophor, particularly the polycrystalline type, be kept below a certain critical dimension at which the radiation generated or developed therein can escape from the luminophor for subsequent measurement by suitable means. A further limitation is imposed by the fact that such luminophors as naphthalene, anthracene, and scheelite are not readily adaptable for handling and shaping into the desired forms. Furthermore, most of these luminophors are insensitive to thermal neutrons. The luminophorous crystals, or the so-called "slabs" of such phosphors, are exceedingly fragile and thus are generally unsuited for enduring the wear incident to the ordinary use of the counter. Even at optimum storage conditions such crystals frequently tend to fragmentate, striate and become opaque with a corresponding loss in luminescent efficiency.

Heretofore scintillation counters of the character described, when adapted for use in detecting slow or thermoneutrons, have suffered from the further disadvantage that the luminophorous substance of the counter, when used for thermal or slow neutrons, had to be employed in conjunction with one or more separate layers of material in which the impinging neutrons induced a nuclear reaction. The charged particles resulting from the nuclear reaction were then transmitted to the luminophor with the result that scintillations were induced therein, in a number proportional to that of the impinging neutrons. The sensitivity of such counters was excessively reduced since only a small proportion of the total number of neutrons impinging upon the counter was absorbed therein to produce scintillations. Before the present invention, no luminophorous material in the form of a large transparent body whether organic or inorganic has been disclosed which of itself efficiently detects thermoneutrons. Moreover, no luminophorous material has yet been employed for this purpose which is relatively insensitive to the gamma radiation frequently associated with nuclear reactions.

Since prior scintillation counters depended on charged particles such as alpha, beta, and gamma rays resulting from the aforesaid nuclear reactions, these counters are thus rendered sensitive to ever-present noise or background radiation produced by cosmic rays and naturally occurring radioactive materials and therefore have been rendered insensitive to relatively low flux densities of thermoneutrons. That is to say, in certain applications where the density of thermoneutrons is equivalent to that of the background radiation, the scintillation counter can no longer be utilized. For these and other applications, it is essential to provide a thermoneutronic scintillator which is insensitive to gamma and other background radiation.

In view of the foregoing, an object of the present invention is to provide a novel and efficient neutronic detector and counter.

Another object of the invention is to provide a high speed counting instrument for thermoneutronic detection.

A further object of the invention is to provide a neutronic scintillation counter which is insensitive to gamma and other background radiation.

Still another object of the invention is to minimize the number of component parts employed in a thermoneutronic scintillation counter.

Yet another object of the invention is to provide a scintillation counter with means for increasing the neutron sensitivity thereof.

Figure 2:
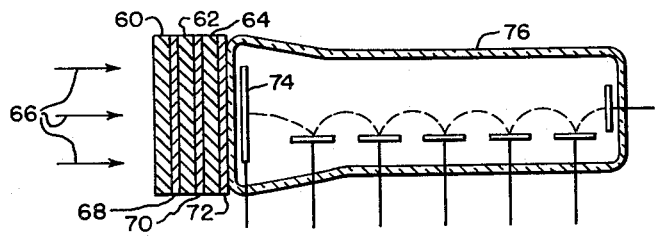

These and other objects, features and advantages of the invention will be set forth during the ensuing description of exemplary forms of the invention, with the description being taken in conjunction with the accompanying drawing wherein:

FIGURE 1 is a schematic representation of one form of a thermoneutronic scintillator constructed according to the invention; and FIG. 2 is another form of scintillation counter contemplated by the invention.

According to the invention, a single crystalline material is employed which is adapted to convert the energies of impinging thermoneutrons directly into ultraviolet light of high frequency. Means are associated with the crystalline material for color-shifting the ultraviolet radiation emitted by the crystal to a visible blue or near-ultraviolet light, which light is then transmitted to the photocathode of a suitable photomultiplier tube which usually has sensitivity at the blue or near-ultraviolet region of the spectrum.

Referring now more particularly to FIG. 1 of the drawing, the exemplary form of the invention therein includes a single crystalline material 20 such as lithium bromide-silver (LiBr-Ag), lithium chloride-silver (LiCl-Ag)

or the like, which is exposed to a source of thermoneutrons as indicated by the arrows 22. On at least face 24 of the crystalline material 20 and which face is disposed opposite to the impinging neutrons 22 is a thin layer or coating 26 of "color-shifting" or wave-shifting compound such as sodium salicylate, quaterphenyl, 1,4-bis-2-(5-phenyl oxazolyl)benzene, and 1,1,4,4-tetraphenyl butadiene. Alternatively, the coating 26 of the color shifting material may be provided on all of the outward surfaces of the crystalline material 20, as shown in FIG 1 of the drawing. The color-shifting material 26 operates to convert the short wave-length ultraviolet photons emitted by the single crystalline material 20 to a visible blue or long wave-length ultraviolet light to which the photocathode 28 of a photomultiplier tube 30 is sensitive. A light reflector, not shown, can be used outside of the crystal to aid in gathering the emitted light to the photocathode.

From the photocathode 28 the electron stream 32, which is emitted therefrom by impingement of photons, as is well known, is cascaded along a number of dynodes 34 to an anode 36. The photocathode 28, the dynodes 34 and the anode 36 are coupled to the output of a power supply 38 or other suitable source of electric potential by means of conductors 40 and a series resistance-bank 42. The output of the photomultiplier tube 30 is connected via conductor 44 to the grid of a first amplifying tube 46 of the amplifier 48. The output of the first amplifier tube is capacitively coupled to the grid of a second amplifying tube 50 of the amplifier. The output of the amplifier 48 is connected by means of conductors 52 to a conventional counting-rate meter or scaler 54. The counting-rate meter may be similar to that described in detail on page 251 and illustrated in FIG. 4.21 of the book "Electronics" by Elmore and Sands, National Nuclear Energy Series. The counting-rate meter is connected to a commercial source of power 56.

In many applications of the invention the ultraviolet radiation produced within the crystal 20 of the arrangement of FIG. 1 is attenuated too greatly, or, on the other hand, greater amplification thereof is required without complicating the amplifying circuitry. One form of the invention adapted for minimizing attenuation of the short wave-length ultraviolet output of the polycrystalline material is illustrated in FIG. 2 of the drawing. In this latter arrangement, the single crystalline material is provided in a plurality of layers or slabs 60, 62 and 64 with the layer 60 having a face thereof exposed to a source of thermoneutrons indicated generally by the arrows 66. Upon the oppositely disposed faces of each of the polycrystalline slabs 60, 62 and 64 is provided a layer or coating 68, 70 or 72 of the color-shifting material described heretofore. The inward color-shifting layers 68 and 70 are disposed such that they are secured between adjacent pairs of the polycrystalline slabs 60, 62 and 64, respectively. The assembly is supported such that the outermost coating 72 is supported adjacent a photocathode 74 of a suitable photomultiplying tube 76. The photomultiplying tube 76 is substantially similar, in this example of the invention, to the photomultiplying tube 30 described heretofore in connection with FIG. 1 of the drawing and thus can be operated in a similar manner as by coupling to the power supply 38 the amplifier 48 and counting-rate meter 54 (FIG. 1).

In the operation of the invention, a thermoneutron impinging upon the single crystalline material 20, or 60, 62, 64 (LiCl-Ag) or (LiBr-Ag) induces a nuclear reaction within the crystalline material in accordance with the following nuclear equation:

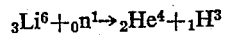

$$_3Li^6 + {_0}n^1 \rightarrow {_2}He^4 + {_1}H^3$$

According to this reaction an atom of lithium combines with a thermoneutron and then fissions to form an energetic alpha particle and a triton, or the nucleus of a tritium atom. The high energy alpha and triton particles emit short wave-length ultraviolet photons or scintillations within the aforesaid material comprising the crystalline luminophor in accordance with the invention and containing the lithium atoms which enter into the aforementioned reaction. Thus, the use of a separate material in conjunction with the luminophor for the production of charged particles in the separate material, upon impingement with thermoneutrons, is obviated. Moreover, the lithium (Li⁶) component of the crystalline material possesses a high thermoneutronic capture cross section. For still more efficient counting purposes, pure or enriched Li⁶, rather than natural Li which contains only 7.5% Li⁶, is utilized. Therefore, virtually all of the thermoneutrons impinging upon the crystalline slabs 20 or 60 are absorbed, and the efficiency of the disclosed counter is increased greatly in comparison with conventional counters.

The ultraviolet light produced directly within the crystalline material, in this manner, then is wave-shifted by the color-shifting material indicated heretofore and comprised in the coating 26, to a visible blue light or low frequency ultraviolet light. The luminescence of the crystal, in this form of the invention, then can be received and amplified by the photomultiplier tube 30 and associated electrical circuitry. In the arrangement illustrated in FIG. 2 of the drawing, the short-wave ultraviolet light of each of the slabs 60, 62 and 64 is converted more or less immediately into near-ultraviolet or visible light, as aforesaid, by the respective color-shifting coatings 68, 70 and 72 which light is not then attenuated to any great extent as it passes through adjacent polycrystalline slabs 60, 62 or 64.

In one application of the invention the minimal thickness of the polycrystalline material 20 (FIG. 1) or the combined minimal thicknesses of the polycrystalline slabs 60, 62 and 64 (FIG. 2) may be calculated from the following formula:

$$P = 100\ (1 - e^{-t\rho N\sigma/W})$$

where:

$P$ = percentage of neutronic flux absorbed in the crystal.
$t$ = thickness of LiCl-Ag or LiBr-Ag crystal in cm.
$\rho$ = density of LiCl-Ag or LiBr-Ag crystal in gm./cm.³
$\sigma$ = average neutron capture cross section of total Li in cm.²
$N$ = Avogadro number.
$W$ = formula weight of LiCl or LiBr.

Assuming:

$P = 99\%$.
$\sigma = 70 \times 10^{-24}$ cm.² for natural lithium.

It is found that:

$t = 2.24$ cm. for LiCl-Ag.
$t = 2.74$ cm. for LiBr-Ag.

It has been found that respective crystals of the single crystalline material mentioned above of these thicknesses can be grown with relative ease. The total thickness of the crystalline material thus is seen to be dependent upon the absorptional efficiency of the counter, which in this case is arbitrarily set at 99%.

From the foregoing it will be apparent that a novel and efficient neutronic scintillation counter has been disclosed herein. The counter is unique in its property of having a high efficiency for slow or thermal neutrons and at the same time for being insensitive to concomitant gamma radiation and background noise.

Numerous modifications of the aforedescribed exemplary arrangements of the invention will occur to those skilled in the art without departing from the spirit and scope of the invention. Moreover, it is to be understood that certain features of the invention can be utilized with a corresponding use of other features.

Accordingly what is claimed as new is:

1. In a scintillation counter, the combination comprising a crystalline material arranged for exposure to a source of neutrons, said material having the property of emitting ultraviolet light upon impingement by said neutrons, a color-shifting compound disposed adjacent at lease one face of said crystalline material, and means for measuring the light emitted from said color-shifting compound.

2. In a scintillation counter, the combination comprising a lithium-containing crystalline material arranged for exposure to a source of neutrons, said material having the property of emitting ultraviolet light upon impingement by said neutrons, a color-shifting compound disposed adjacent a face of said crystalline material, and means for measuring the light emitted from said color-shifting compound.

3. In a scintillation counter, the combination comprising a body of crystalline material having a face thereof arranged for exposure to a source of neutrons, said crystalline material having the property of emitting ultraviolet light upon impingement of said neutrons, a layer of color-shifting compound coated at least on a face of said body oppositely disposed from said first-mentioned face, and means arranged adjacent to said color-shifting material for measuring the light emitted from said color-shifting compound.

4. In a scintillation counter, the combination comprising a plurality of spacedly but relatively closely arranged slabs of crystalline material, said material being exposed to a source of neutrons and having the property of emitting ultraviolet radiation upon impingement by said neutrons, layers of a color-shifting compound inserted between said slabs and disposed at least on an outward surface of said slab arrangement opposite from the area of said impingement, and means for measuring the light emitted from said color-shifting layers.

5. In a scintillation counter, the combination comprising a crystalline material arranged for exposure to a source of neutrons, said material having the property of emitting ultraviolet light upon impingement of said neutrons and selected from the group consisting of lithium chloride-silver and lithium bromide-silver, a color-shifting compound disposed adjacent at least one face of said crystalline material, and means for measuring the light emitted from said color-shifting compound.

6. In a scintillation counter, the combination comprising a crystalline material arranged for exposure to a source of neutrons, said material having the property of emitting ultraviolet light upon impingement by said neutrons and formed from lithium chloride-silver, a color-shifting compound disposed adjacent at least one face of said crystalline material, and means for measuring the light emitted from said color-shifting compound.

7. In a scintillation counter, the combination comprising a crystalline material arranged for exposure to a source of neutrons, said material having the property of emitting ultraviolet light upon impingement by said neutrons and formed from lithium bromide-silver, a color-shifting compound disposed adjacent at least one face of said crystalline material, and means for measuring the light emitted from said color-shifting compound.

8. In a scintillation counter, the combination comprising a crystalline material arranged for exposure to a source of neutrons, said material having the property of emitting ultraviolet light upon impingement by said neutrons, a color-shifting compound disposed adjacent at least one face of said crystalline material and selected from a group of compounds consisting of sodium salicylate, quaterphenyl, 1,4-bis-2-(5 phenyl oxazolyl) benzene, and 1,1,4,4-tetraphenyl butadiene, and means for measuring the light emitted from said color-shifting compound.

9. In a scintillation counter, the combination comprising a crystalline material arranged for exposure to a source of neutrons, said material having the property of emitting ultraviolet light upon impingement by said neutrons, a color-shifting compound disposed adjacent at least one face of said crystalline material and formed from sodium salicylate, and means for measuring the light emitted from said color-shifting compound.

10. In a scintillation counter, the combination comprising a crystalline material arranged for exposure to a source of neutrons, said material having the property of emitting ultraviolet light upon impingement by said neutrons, a color-shifting compound disposed adjacent at least one face of said crystalline material and formed from quaterphenyl, and means for measuring the light emitted from said color-shifting compound.

11. In a scintillation counter, the combination comprising a crystalline material arranged for exposure to a source of neutrons, said material having the property of emitting ultraviolet light upon impingement by said neutrons, a color-shifting compound disposed adjacent at least one face of said crystalline material and formed from 1,4-bis-2-(5 phenyl oxazolyl)-benzene, and means for measuring the light emitted from said color-shifting compound.

12. In a scintillation counter, the combination comprising a crystalline material arranged for exposure to a source of neutrons, said material having the property of emitting ultraviolet light upon impingement by said neutrons, a color-shifting compound disposed adjacent at least one face of said crystalline material and formed from 1,1,4,4-tetraphenyl butadiene, and means for measuring the light emitted from said color-shifting compound.

References Cited in the file of this patent

UNITED STATES PATENTS

| | | |
|---|---|---|
| 2,344,042 | Kallmann et al. | Mar. 14, 1944 |
| 2,534,922 | Marshall | Dec. 19, 1950 |
| 2,783,386 | Mandeville | Feb. 26, 1957 |
| 2,799,780 | Ruderman | June 16, 1957 |
| 2,853,621 | Ruderman | Sept. 23, 1958 |
| 2,899,560 | Nemet | Aug. 11, 1959 |

OTHER REFERENCES

Glasstone et al.: Nuclear Reactor Theory, published 1952 by Van Nostrand, pp. 35, 36 used.

Schardt et al.: A.E.C. Document BNL–1156, September 1953, 28 pp.

Eggler et al.: Nucleonics, vol. 14, No. 4, pp. 34 to 36, April 1956.

Muehlhause: Nucleonics, vol. 14, No. 4, pp. 38, 39, April 1956.